(12) United States Patent
Fine

(10) Patent No.: US 7,281,020 B2
(45) Date of Patent: Oct. 9, 2007

(54) PROPRIETARY INFORMATION IDENTIFICATION, MANAGEMENT AND PROTECTION

(76) Inventor: Naomi Fine, 8170 Hansom Dr., Suite 100, Oakland, CA (US) 94605

(*) Notice: Subject to any disclaimer, the term of this patent is extended or adjusted under 35 U.S.C. 154(b) by 549 days.

(21) Appl. No.: 10/317,815

(22) Filed: Dec. 12, 2002

(65) Prior Publication Data

US 2003/0135386 A1 Jul. 17, 2003

Related U.S. Application Data

(60) Provisional application No. 60/339,733, filed on Dec. 12, 2001.

(51) Int. Cl.
*G06F 17/00* (2006.01)
*G06F 7/00* (2006.01)
(52) U.S. Cl. .................. 707/104.1
(58) Field of Classification Search ............. 707/104.1
See application file for complete search history.

(56) References Cited

U.S. PATENT DOCUMENTS

| | | | | |
|---|---|---|---|---|
| 5,850,516 | A * | 12/1998 | Schneier | 726/25 |
| 5,991,709 | A * | 11/1999 | Schoen | 704/1 |
| 6,374,358 | B1 * | 4/2002 | Townsend | 726/1 |
| 6,408,391 | B1 * | 6/2002 | Huff et al. | 726/22 |
| 6,535,227 | B1 * | 3/2003 | Fox et al. | 715/736 |
| 6,631,473 | B2 * | 10/2003 | Townsend | 726/25 |
| 6,735,701 | B1 * | 5/2004 | Jacobson | 726/1 |
| 6,925,443 | B1 * | 8/2005 | Baggett et al. | 705/10 |
| 2003/0065942 | A1 * | 4/2003 | Lineman et al. | 713/201 |
| 2003/0154393 | A1 * | 8/2003 | Young | 713/200 |
| 2004/0006532 | A1 * | 1/2004 | Lawrence et al. | 705/38 |
| 2004/0024693 | A1 * | 2/2004 | Lawrence | 705/38 |
| 2004/0024694 | A1 * | 2/2004 | Lawrence et al. | 705/38 |
| 2005/0166259 | A1 * | 7/2005 | Neupart | 726/1 |

FOREIGN PATENT DOCUMENTS

| | | | |
|---|---|---|---|
| EP | 0999489 A2 | * | 5/2000 |
| EP | 1039401 A2 | * | 9/2000 |
| WO | WO 01/59989 A2 | * | 8/2001 |

OTHER PUBLICATIONS

Tanzer, M. "Keep Spies Out of Your Company", Personnel Journal, vol. 72, No. 5, May 1993, pp. 44-50.*
Tanzer, M. "The Spying Game", Sales & Marketing Management, vol. 145, No. 6, Jun. 1993, pp. 60-65.*

(Continued)

*Primary Examiner*—Luke S Wassum
(74) *Attorney, Agent, or Firm*—Joseph P. Kincart

(57) ABSTRACT

Computerized methods and systems are presented for facilitating identification, management and/or protection of proprietary information. Data can be received that is descriptive of proprietary information, entities involved in creating, conveying, receiving or accessing the proprietary information as well as any information that will be created, conveyed, received or accessed. The system receives data and generates suggested actions and artifacts to aid in the identification, management and/or protection of proprietary information that may result from the circumstances described by the data received. Embodiments can also include receiving data descriptive of a process and determining potential proprietary information that may be involved. Relevant suggested actions and artifacts can also be generated.

23 Claims, 8 Drawing Sheets

OTHER PUBLICATIONS

Ubois, J. "Keeping Secrets", Midrange Systems, vol. 6, No. 18, Sep. 28, 1993, pp. 56-57.*

Englman, S. "Securing the Virtual Corporation", Security Management, vol. 37, No. 11, Nov. 1993, pp. 28-30.*

United States Congress "18 USC 90—The Economic Espionage Act of 1996", 1996.*

Farnham, A. "How Safe are Your Secrets?", Fortune, vol. 136, No. 5, Sep. 8, 1997, pp. 114-120.*

Fine, N. "The Economic Espionage Act: Turning Fear into Compliance", Competitive Intelligence Review, vol. 8, No. 3, Fall 1997.*

Fine, N. "Information Loss: Reducing Your Biggest Risk", downloaded from www.pro-tecdata.com, 1997.*

Fine, N. "Competitive Intelligence: An External Threat and an Internal Requirement", downloaded from www.pro-tecdata.com, 1997.*

Pro-Tec Data "Economic Espionage Act Compliance Programs", downloaded from www.pro-tecdata.com, May 5, 1998.*

Pro-Tec Data "Proven Solutions That Work for You", downloaded from www.pro-tecdata.com, May 5, 1998.*

Pagell, R. "Economic Espionage", Database, vol. 21, No. 4, Aug./Sep. 1998, pp. 23-30.*

Power, R. and R. Farrow "Crime and Punishment in Cyberspace", Network, vol. 13, No. 12, Nov. 1998, p. 84.*

Fraumann, E. and J. Koletar "Trade Secret Safeguards", Security Management, vol. 43, No. 3, Mar. 1999, pp. 63-66.*

Bentley, T. "Be Paranoid", Georgia Trand, vol. 14, No. 12, Aug. 1999, p. 52.*

Horowitz, R. "Competitive Intelligence and the Economic Espionage Act", Society of Competitive Intelligence Professionals, www.scip.org, 1999.*

Korzeniowski, P. "Audit and Assessment", Information Security, Aug. 2000.*

Pro-Tec Data "Information Protection Consulting Services", downloaded from www.pro-tecdata.com, Sep. 14, 2000.*

Penttila, C. "Put a Lid on It: Protecting Company Secrets", Entrepreneur, vol. 28, No. 12, Dec. 2000, p. 110.*

Helms, M.M., L.P. Ettkin and D.J. Morris "Shielding Your Company Against Information Compromise", Information Management & Computer Security, vol. 8, No. 3, 2000, pp. 117-130.*

Morris, D.J., L.P. Ettkin and M.M. Helms "Issues in the Illegal Transference of US Information Technologies", Information Management & Computer Security, vol. 8, No. 4, 2000, pp. 164-172.*

Carr, C., J. Morton and J. Furniss "The Economic Espionage Act: Bear Trap or Mousetrap?", Texas Intellectual Property Law Journal, vol. 8, No. 2, Winter 2000, pp. 159-209.*

Barth, S. "Protecting the Knowledge Enterprise", Knowledge Management, Mar. 2001, pp. 44-52.*

Xacta "Xacta Web C&A™ 2001 User Guide", Aug. 27, 2001.*

Rothke, B. "Corporate Espionage and What Can Be Done to Prevent It", Information Systems Security, Nov./Dec. 2001.*

Briney, A. "Automating Policies", Information Security, Oct. 2002.*

Erickson, G.S., H.N. Rothberg and C.A. Carr "Knowledge-Sharing in Value-Chain Networks: Certifying Collaborators for Effective Protection Processes", Advances in Competitiveness Research, vol. 11, No. 1, 2003, pp. 152-164.*

Robinson, R.L. "Securing the Corporation: Integrating CI and Security for Proprietary Information Protection", Competitive Intelligence, vol. 7, No. 2, Mar.-Apr. 2004, pp. 24-28.*

Brown Jr., A., T. Osborn, J.M. Chan and V. Jaganathan "Managing Intellectual Capital", Research Technology Management, vol. 48, No. 6, Nov./Dec. 2005, pp. 34-41.*

Atluri, V. and W-K Huang "An Authorization Model for Workflows", Proceedings of the $4^{th}$ European Symposium on Research in Computer Security, Sep. 25-27, 1996.*

Government of Japan, IT Security Promotion Committee "Guidelines for IT Security Policy", downloaded from www.kantei.go.jp/foreign/it/security/2001/policy_guidelines.pdf, Jul. 18, 2000.*

Varrassi, P.J. "Security Policies in the Workplace", transcript of a webcast, downloaded from searchsecurity.techtarget.com, Mar. 29, 2001.*

Palmer, M.E., C. Robinson, J.C. Patilla and E.P. Moser "Information Security Policy Framework: Best Practices for Security Policy in the E-Commerce Age", Information Systems Security, vol. 10, Issue 2, May/Jun. 2001, pp. 13-27.*

NetVision "NetVision Unveils Policy Management Suite", press release, Aug. 13, 2001.*

PentaSafe "Using People Assets to Protect Information Assets: Understanding the "Human Factor" of Information Security", white paper, downloaded from www.pentasafe.com, 2001.*

Marcinkowski, S.J. and J.M. Stanton "Motivational Aspects of Information Security Policies", Proceedings of the IEEE International Conference on Systems, Man and Cybernetics, Oct. 5-8, 2003, pp. 2527-2532.*

Lacey, D. "Taking the Pain Out of IT Regulatory Compliance", white paper, downloaded from www.brabeion. com, May 2006.*

Brabeion "Easing the Audit—Part II", white paper, downloaded from www.brabeion.com, 2006.*

Brabeion "Enterprise Security Architecture System", white paper, downloaded from www.brabeion.com, undated.*

Wood, C.C. "Information Security Policies Made Easy", Version 6, Baseline Software, Inc., pp. 1-32, 156-158, 163-168, 198-204, 345-346, 386-464, 1997. ISBN 1-881585-04-2. QA76.9.A25 W664 1997.*

\* cited by examiner

310 RECEIVE DATA DESCRIPTIVE OF PROPRIETARY INFORMATION

311 RECEIVE DATA DESCRIPTIVE OF ONE OR MORE ENTITIES

312 RECEIVE DATA DESCRIPTIVE OF A TIME PERIOD

313 RECEIVE DATA DESCRIPTIVE OF CIRCUMSTANCES DURING WHICH INFORMATION WILL BE CREATED, CONVEYED, RECEIVED OR ACCESSED

314 GENERATE ONE OR MORE SUGGESTED ACTIONS

FIG. 3A

320 RECEIVE DATA DESCRIPTIVE OF INFORMATION

321 PRESENT A DESCRIPTION OF ONE OR MORE CLASSIFICATIONS THAT CAN BE ASSOCIATED WITH THE INFORMATION, EXAMPLES OF INFORMATION ASSOCIATED WITH EACH CLASSIFICATION OR A PURPOSE FOR EACH CLASSIFICATION

322 RECEIVE AN INDICATION OF A CLASSIFICATION TO BE ASSOCIATED WITH THE INFORMATION

323 GENERATE A USER OBLIGATION

FIG. 3B

PROPRIETARY INFORMATION IDENTIFICATION, MANAGEMENT AND PROTECTION

CROSS-REFERENCE TO RELATED APPLICATIONS

This application claims priority to the Provisional Application entitled "Information Protection" filed Dec. 12, 2001 and bearing Ser. No. 60/339,733, the contents of which are relied upon and incorporated by reference.

BACKGROUND

This invention relates generally to a method and system for facilitating the identification, assessment, management and/or protection of proprietary information. In particular, the present invention relates to computerized systems and methods for receiving data relating of proprietary information and generating suggested actions for protecting the information. In addition the present invention provides methods and systems to facilitate generation of documents relating to the identification, management and/or protection of proprietary information.

Individuals and organizations, including commercial and non-commercial organizations, such as: a corporate entity; limited liability company (LLC), partnership, proprietorship, law firm, accounting firm, auditing firm and other entities, typically have few resources available to them to assist in the identification, management and/or protection of proprietary information or other intellectual property assets. The consequences of mismanagement of such information can be multifaceted and far-reaching, affecting many aspects of a business. Generally, personnel involved with such information do not have available a mechanism to provide real time assistance to assess how information should be treated in order to properly protect such information. In the event of problems, it is often difficult to quantify to an adverse party, a court of law, a legal authority or other interested party, the diligence exercised by the organization to properly identify and protect valuable proprietary information.

What is needed are methods and systems to facilitate analysis of circumstances, persons, organizations and information involved in day to day events, as well as exceptional events, and generate suggested actions directed to the identification, management and/or protection of proprietary information and intellectual property.

SUMMARY

Accordingly, the present invention provides methods and systems that offer guidance to personnel who interact with information by generating suggested actions, training, instruction and/or artifacts responsive to data received that is descriptive of a situation.

Embodiments can include: a computerized system; computer executable program code residing on a computer-readable medium; a computer data signal embodied in a digital data stream; or a method of interacting with a network access device; for managing information and intellectual property assets associated with an organization. Various features and embodiments are further described in the following description, figures, drawings, screen shots and claims.

DESCRIPTION OF THE DRAWINGS

FIG. 3A illustrates a flow of exemplary steps that can be executed while implementing some embodiments of the present invention.

FIG. 3B illustrates a flow of additional exemplary steps that can be executed while implementing some embodiments of the present invention.

DETAILED DESCRIPTION

The present invention provides computerized methods and systems for facilitating the identification, assessment and protection of proprietary information. A computerized system receives and categorizes organizational practices, policies, legal guidelines and other information in a database or other data storing structure. Data can be received that is descriptive of circumstances under which proprietary information will be created, conveyed, received, or accessed. Documents and suggested actions can be generated based upon the data received. The documents and suggested actions can be directed to the identification, assessment, management and protection of the proprietary information. The present invention can also track who has access to proprietary information and under what circumstances such access can occur.

For the purposes of this document, an entity can include an individual, a group of people, an organization, a company, a corporation, any legally definable "person" or other ascertainable group of people. Proprietary information can include any information that the subject entity has a desire to hold an ownership interest in and/or protect and can include therefore all forms of intellectual property.

Elements

Figure 1:
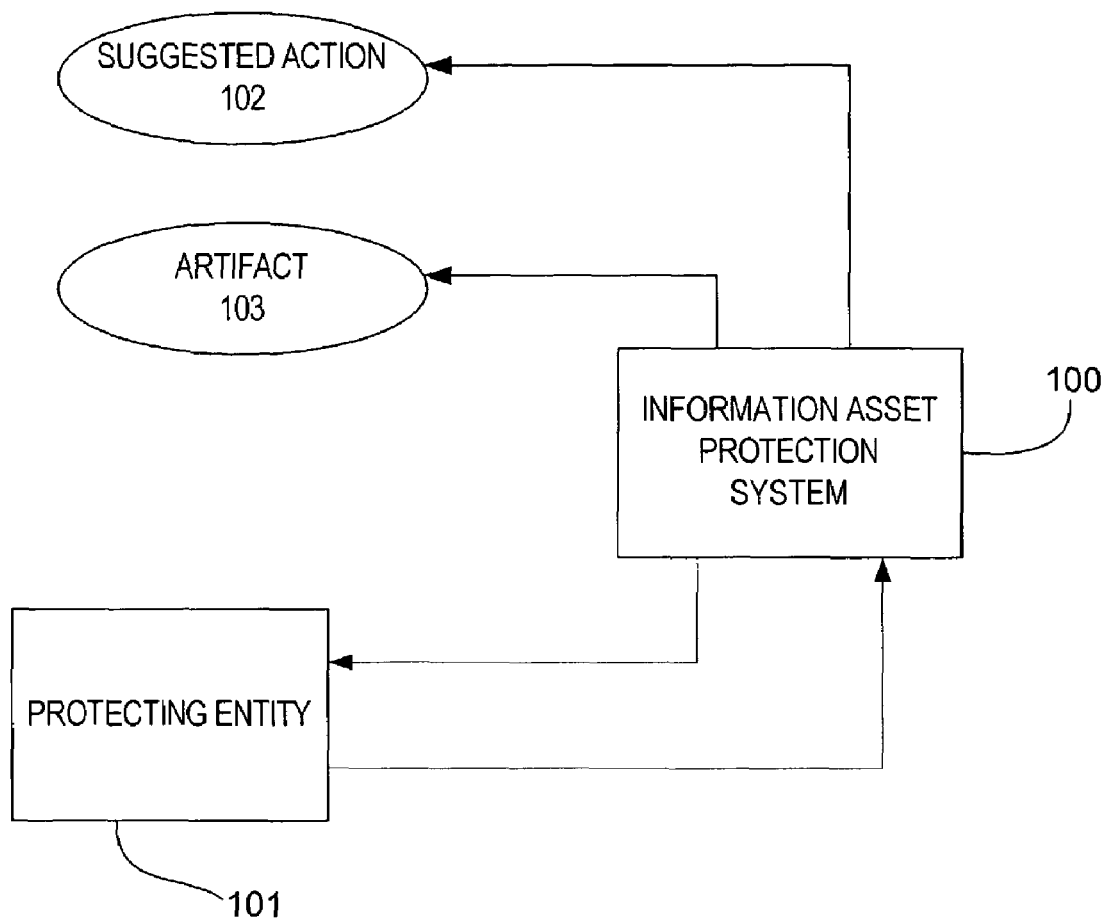
FIG. 1 illustrates block diagrams of some embodiments of the present invention.

Referring now to FIG. 1 a block diagram of some embodiments of the present invention is illustrated. An Informational Asset Protection (IAP) system 100 is programmed to receive data descriptive of the creation, conveyance, receipt or access of proprietary information and generate one or more suggested actions 102 and/or artifacts 103 for protecting the proprietary information. The data can be received from, or on behalf of, a protecting entity 101. A suggested action 102 can be specific to a set of circumstances or generally directed to the identification, management and/or protection of proprietary information and be reflective of policies, procedures, legal guidelines, organizational practices, customer relations, or other considerations important to the protecting entity 101 and/or an organization or person involved. Similarly, an artifact 103 can be specific to a set of circumstances or generally directed to the identification, management and/or protection of proprietary information and reflective of the same considerations.

Data can be received, for example, through input received via a graphical user interface (GUI). A user can provide answers to a series of questions or prompts pertinent to a particular situation. The user will only need to be able to provide details related to the situation and not be required to have any special knowledge related to the identification, management and/or protection of proprietary information. For example, embodiments can include a GUI that receives data descriptive of an upcoming meeting. The data can include a description of who will attend the meeting, the purpose of the meeting, the types of information that will be created, conveyed, received or accessed during the meeting, how the information will be created, conveyed, received or accessed, or other descriptive data.

Another example can include receiving data descriptive of a relationship of an entity to another entity, such as, an employee, a contract employee, a consultant, a customer or supplier of a company.

Some embodiments can include receiving data that is gleaned from systems utilized to conduct the business of an entity. For example, during creation or modification of a document, a user can be prompted for data descriptive of the content or purpose of a document, who should be granted access to the document, any events associated with the content of the document, any time periods associated with the events, or other relevant data. Other examples can include data descriptive of scheduled events entered into an electronic calendar or contact information entered into an electronic organizer.

Types of proprietary information can include, for example, but limited to: written documents, descriptions of processes, compiled data, know how, customer lists, customer habits, business plans, presentation material, multimedia, business models, source code, financial statements, trade secrets, patent applications, invention disclosures, reorganization plans, prospective acquisitions or divestitures, manufacturing specifications, test results, project cost and budgets, pricing proposals, employee records including but not limited to disciplinary matters, organizational charts, internal survey data, product information, formulas, engineering drawings and/or specifications, competitive analysis, manufacturing processes or any other information that may have value for the entity.

A suggested action 102 can be generated that is responsive to, or otherwise based upon the data received that is descriptive of proprietary information. A suggested action can include an action to be performed by the IAP system 100, by a user, or by some other entity and be directed toward one or more avenues of protection for the proprietary information. For example, a suggested action may include generation and execution of a non-disclosure agreement. An obvious effect of the execution of the NDA is that it can create certain legal rights. Other, perhaps less obvious effects of the execution of the NDA, can include an increased awareness of how information that is subject to the NDA should be handled, notice that the information is considered proprietary, memorializing the parties acknowledgement that the information is considered proprietary, delineation of a time period during which the information is to be considered proprietary, or other effect. Accordingly, embodiments can include generation of suggested actions that may be overlapping and complimentary in their effect.

In various embodiments, suggested actions can include, for example: executing a non-disclosure agreement with language stating an intent to bind one or more entities regarding disclosure of the proprietary information; determining a time period during which a classification will be associated with the proprietary information; associating an indicator of the classification with the proprietary information during a time period; restricting access to the proprietary information; storing an indication of which user accesses the proprietary information and when each access occurs; filing a patent application; tracking one or more entities to whom the proprietary information is revealed and/or from whom it is received; the development of an inventory of proprietary information; or other action.

An artifact 103 can include any item, reference or thing generated as a result of human endeavor and directed to the identification, management and/or protection of proprietary information. Typically, an artifact 103 will include a document, or entry into a database, that is directed towards protection of specific proprietary information. In some embodiments, an artifact 103 can therefore include a document, such as: a classification label; a confidentiality notice; an instruction sheet for handling the proprietary information; an agreement with language stating an intent to bind one or more entities regarding disclosure of the proprietary information; a meeting notice; a letter on behalf of a first employer to a departing employee; a letter on behalf of a first employer to subsequent employer of a departed employee; and a letter on behalf of an employer to a job applicant; a letter requesting return of confidential information; a certification of return of confidential information; a certification of destruction of confidential information; and a letter subsequent to verbal disclosure of confidential information.

Figure 2:
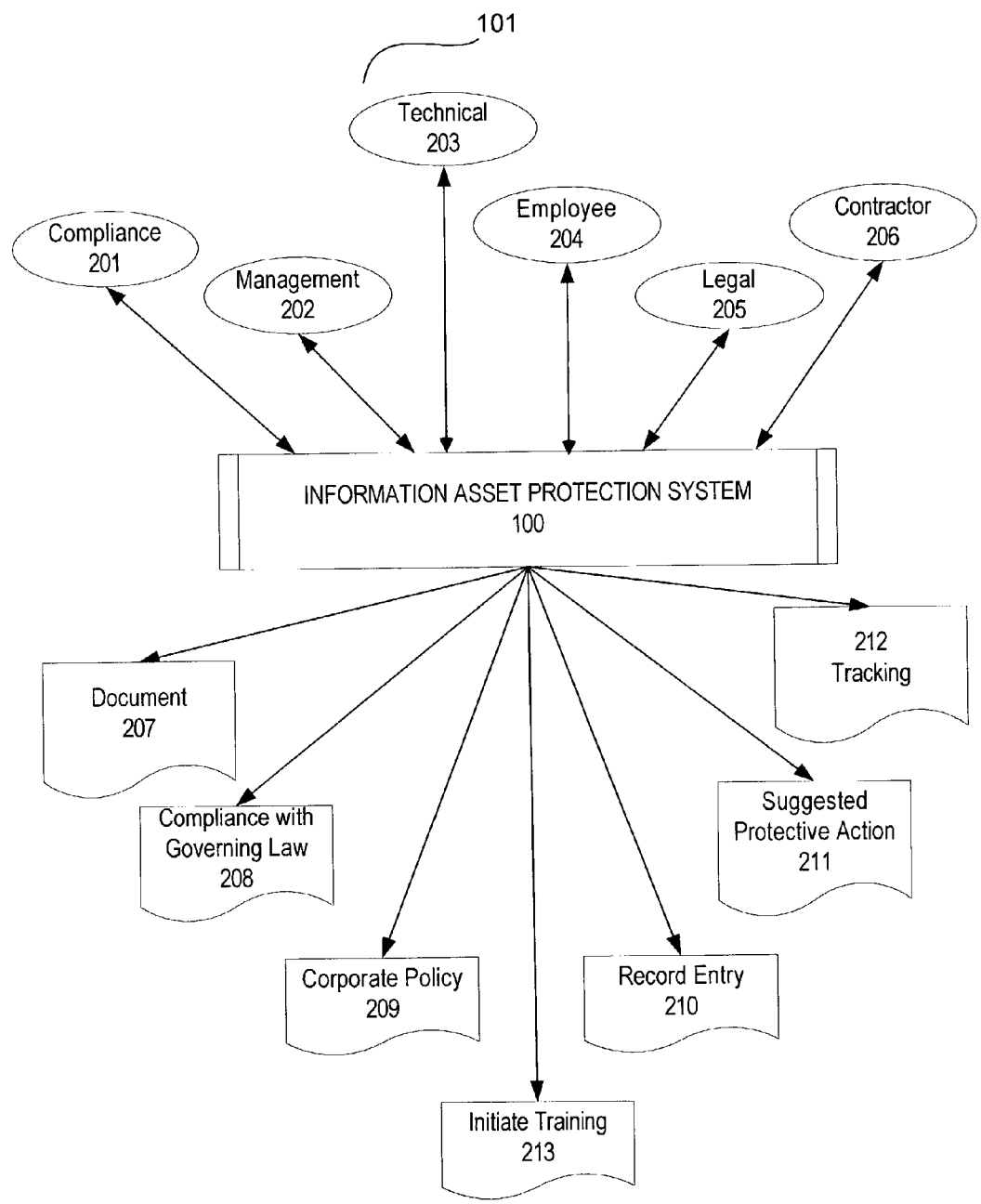
FIG. 2 illustrates a block diagram of some implementations of the present invention.

Referring now to FIG. 2, a block diagram illustrates some specific implementations of the present invention. An IAP can receive input, including data descriptive of proprietary information, from a protecting entity 101. As illustrated, a protecting entity 101 can include: a compliance department 201, company management 202, a technical group 203, an employee 204, a legal department 205, a contractor 206 or other entity. Output from the IAP can include suggested actions 102 and artifacts 103, such as, for example: a document 207, an action to comply with local law 208, an action to comply with corporate policy 209, making an entry into a database record quantifying proprietary information 210, generating a suggested action 211, tracking access to proprietary information 212, and initiate training 213.

Methods

Figure 3C:
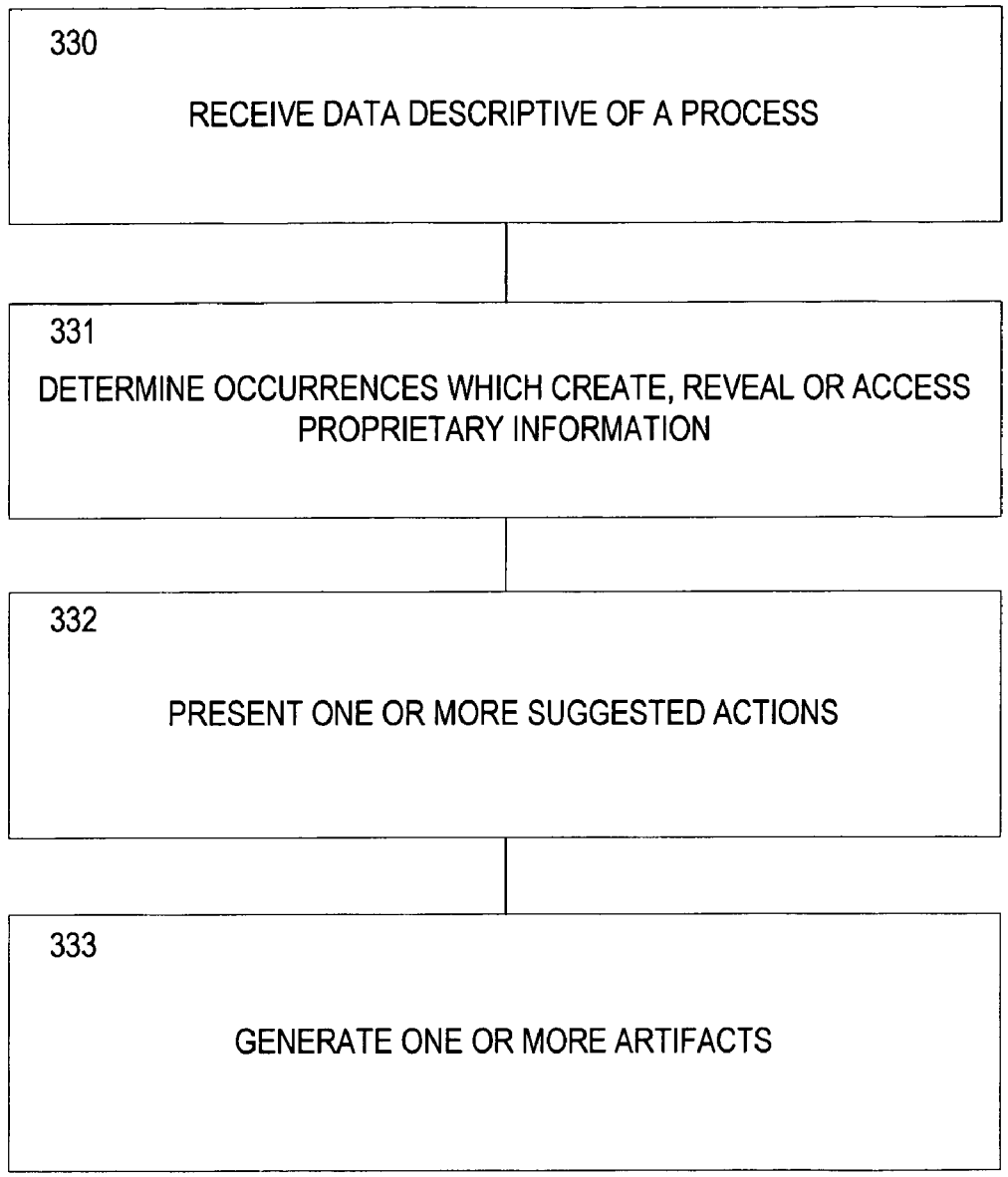
FIG. 3C illustrates a flow of more exemplary steps that can be executed while implementing some embodiments of the present invention.

Referring now to FIGS. 3A-3C, steps that can be implemented while practicing some embodiments of the present invention are illustrated. Steps are presented in an order conducive to this discussion, but the invention is not limited to any particular sequence or set of method steps. Accordingly, various combinations and sequences of steps presented may be utilized while implementing the present invention. At 310-313, data is received by the IAP System 100; this data can be received via any mechanism, method, platform, process that can be utilized for entering data into a computerized information system which can serve as an IAP System 100. At 310, the IAP System 100 can receive data descriptive of proprietary information. Such as, for example those types of proprietary information listed above. At 311 data can be received that is descriptive of one or more entities involved in the creation, conveyance, receipt or access of the proprietary information. At 312 data can be received that is descriptive of a time period relevant to the creation, conveyance, receipt or access of the proprietary information, and/or relevant to whether the information will remain proprietary. At 313 data can be received that is descriptive of circumstance, such as a purpose and setting, during which information will be created, conveyed, received or accessed.

At 314, the IAP System 100 can generate one or more suggested actions 102 based upon the data received. The suggested actions 102 can also be based upon a set of predetermined rules programmed into the IAP System 100. The predetermined rules can be used to implement organizational practices, policies, legal guidelines and other information relevant to a protecting entity 101 in the identification, management and/or protection of proprietary information.

For example, it may be the policy of a company that all contract employees involved in the development of prop info must execute a non-disclosure agreement (NDA) assigning to the company of all intellectual property created or conceived by the contract employees during their engagement with the company. This policy can be programmed into the IAP System 100. When data is received by the IAP System 100 that describes a new contractor employee relationship, the IAP System 100 can generate an NDA document with the appropriate assignment, and suggest that the new contract employee sign the new document, as a condition of the engagement. The IAP System 100 can send out reminders to the individual requesting that the NDA be signed and to the contract employee who is requested to sign the NDA. The IAP system 100 can also receive an indication that the NDA has been signed such as the time the NDA has been signed and place where the NDA will be stored. The database can provide reports indicating that all of the NDA's that have been requested by a particular entity, or requested from a particular entity, such as a contractor, and the status of each NDA. This example This example illustrates how the IAP System 100 can receive data descriptive of the circumstance related to proprietary information (the new contractor arrangement) and generate a suggested action (execute the NDA) and generate a related artifact (the NDA document and NDA status report). The suggested action and artifact relate to the protection of the proprietary information and also facilitate implementation of the company policy.

Referring now to FIG. 3B, additional steps are illustrated that can be utilized to implement other aspects of the present invention. At 320, the IAP System 100 can receive data descriptive of information. At 321, the IAP System 100 can present a description of one or more classifications that can be applied to or otherwise associated with the information. In addition, some embodiments can include presenting examples of the information associated with one or more classifications and/or a purpose for one or more of the classifications. For example, a classification of "confidential" can be described and in order to facilitate an understanding of what is meant by "confidential," examples of what is considered to be confidential information can be presented. In addition, to complete the example, a purpose for classifying information as confidential can also be presented.

At 322 an indication can be received of a classification that will be associated with the information. At 323, a user obligation associated with the classification can be generated and presented. Presentation will typically be accomplished via display on a GUI. Other presentation media can include a hardcopy, facsimile, e-mail, electronic message or other form of communication.

Referring now to FIG. 3C, additional steps are illustrated that can be utilized to implement still other aspects or embodiments of the present invention. At 330, an IAP System 100 can receive data descriptive of a process. The process can include any delineation of steps to accomplish an end result. For example, a process may include implementation of a business plan. During the implementation of a new project several occurrences may create, reveal or access proprietary information. At 331, the IAP System 100 will determine such occurrences. At 332, the IAP System 100 can present one or more suggested action items. The action items can be based upon the data descriptive of the business process for new projects and be associated with the identification, management and/or protection of proprietary information created, revealed, received or accessed as a result of the business process. At 333, the IAP System 100 can generate one or more artifacts related to the protection of the proprietary information. Similar to the action items presented, the artifacts can be based upon the data descriptive of the process and a potential for creating, revealing, or accessing proprietary information as a result of the process.

Systems

Figure 4:
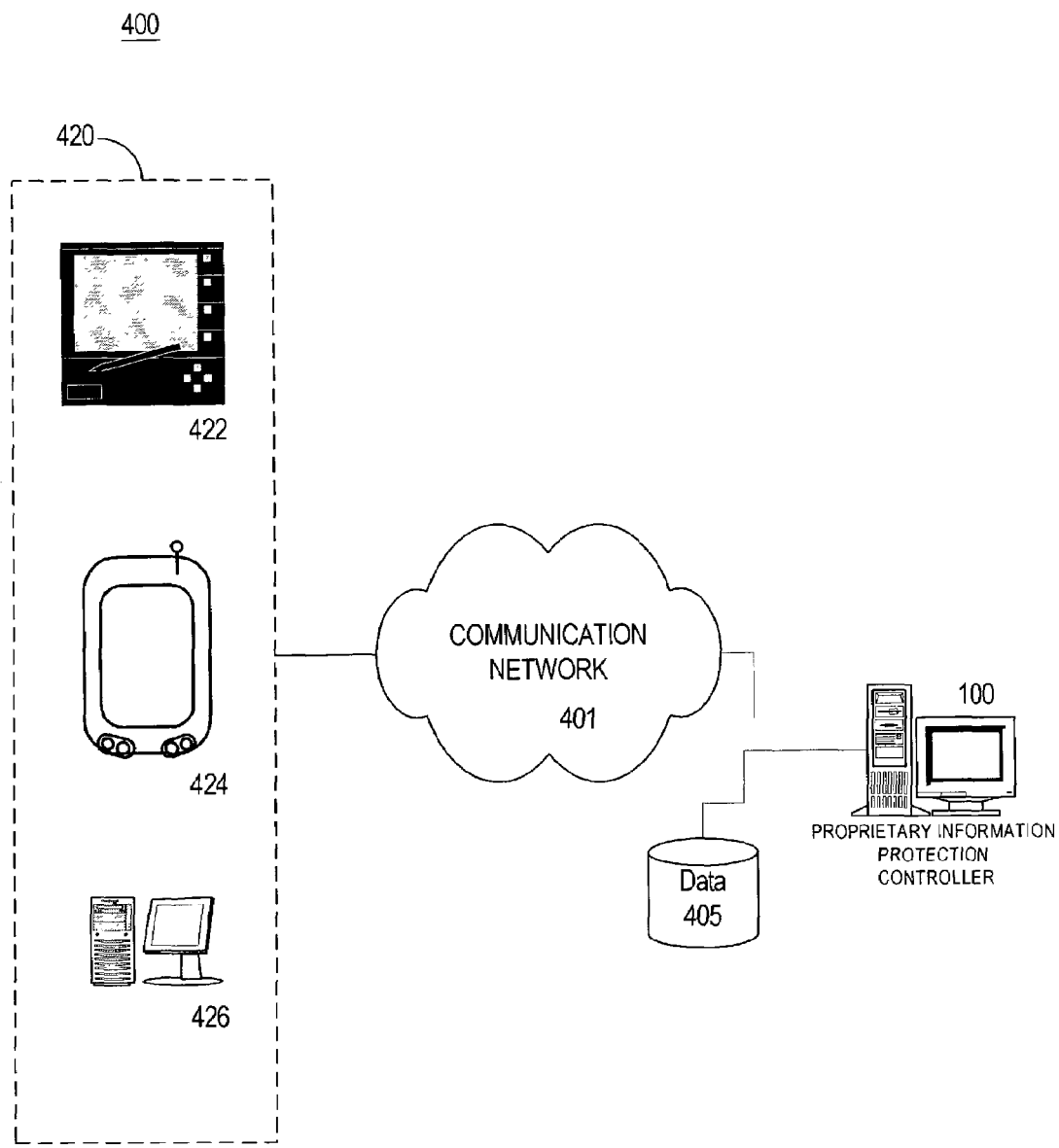
FIG. 4 illustrates a network of computer systems that can be included in some embodiments of the present invention.

Referring now to FIG. 4, a network diagram illustrating components of some embodiments of the present invention is shown 400. An automated IAP System 100 can include a computerized server accessible via a distributed network 401 such as the Internet, or a private network. A user can use a computerized system or network access device 420 to receive, input, transmit or view information processed in the IAP System 100, a peer device, or other network access device 422-426. A protocol, such as, for example, the transmission control protocol internet protocol (TCP/IP) can be utilized to provide consistency and reliability.

A system access device 420 can communicate with the IAP System 100 system 403 or IAP System 100 to access data and programs stored at the respective servers. A system access device 420 may interact with the IAP System 100 system 403 as if the servers were a single entity in the network 400. However, the IAP System 100 system 403 may include multiple processing and database sub-systems, such as cooperative or redundant processing and/or database servers that can be geographically dispersed throughout the network 400.

Figure 5:
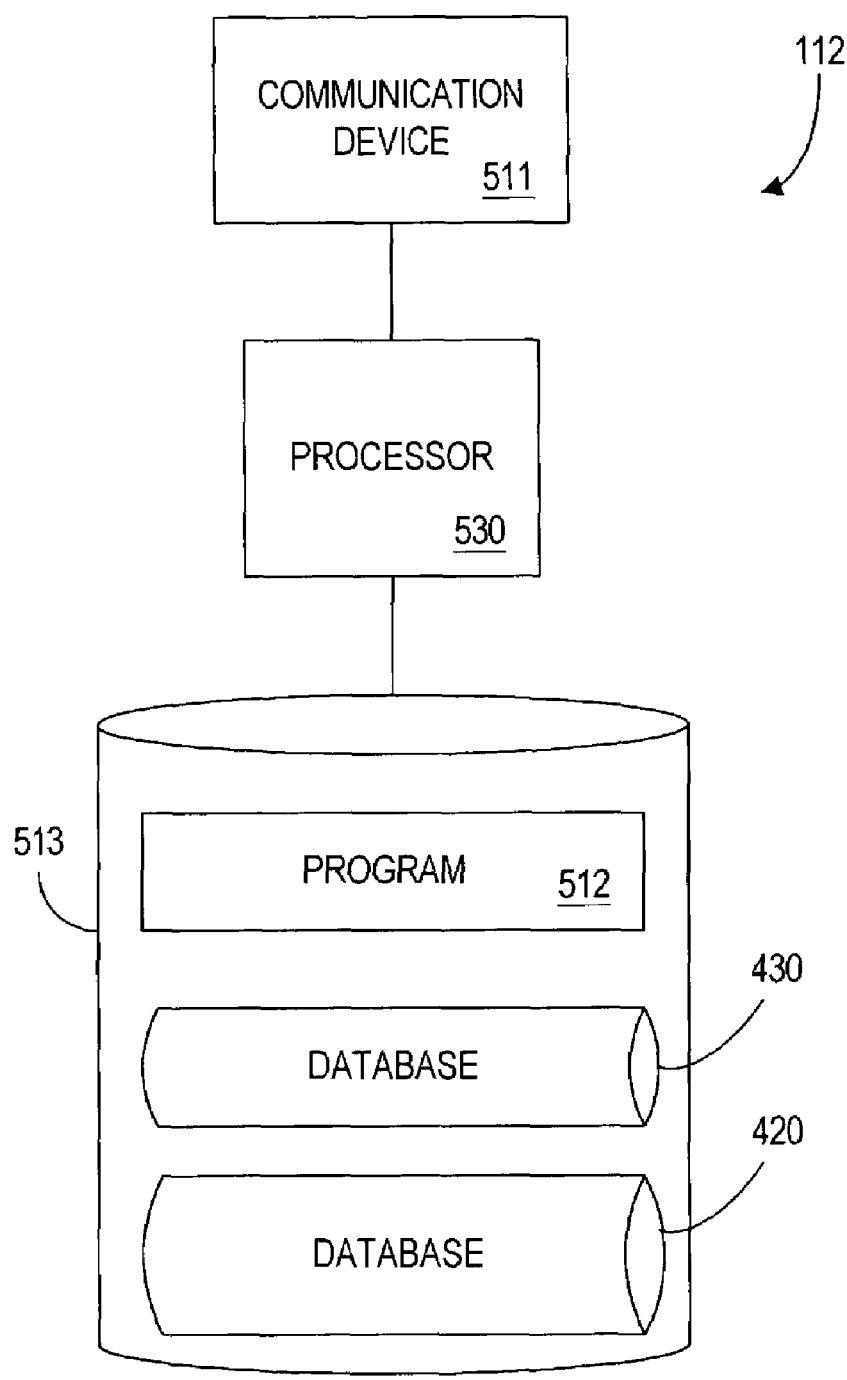
FIG. 5 illustrates a computerized device that can be utilized to implement some embodiments of the present invention.

A server utilized in an IAP System 100 can include a processor, memory and a user input device, such as a keyboard and/or mouse, and a user output device, such as a display screen and/or printer, as further detailed in FIG. 5. The server can also include one or more databases 405 storing data relating to the identification, management and/or protection of proprietary information, entities who may access, create, convey or receive proprietary information; circumstances under which information may be accessed, created, conveyed or received; relevant time periods; venues where proprietary information may be accessed, created, conveyed or received; or other data. In some embodiments, information relating to and included in a data structure 405 can be aggregated into a searchable data storage structure. Gathering data into an aggregate data structure 405, such as a data warehouse, allows a server to have the data readily available for processing a search associated with identification, management and/or protection of proprietary information. Embodiments can also include aggregated data 405 that can also be scrubbed or otherwise enhanced to aid in searching. In addition, the present invention can allow the user to utilize multiple search engines to view and report on information, suggested actions and/or artifacts for specific queries related to identification, management and/or protection of proprietary information.

Typically, an access device 420 will access an IAP System 100 using client software executed at the system access device 420. The client software may include a generic hypertext markup language (HTML) browser, such as Netscape Navigator or Microsoft Internet Explorer, (a "WEB browser"). The client software may also be a proprietary browser, and/or other host access software. In some cases, an executable program, such as a Java™ program, may be downloaded from a server to the system access device 420 and executed at the system access device 420 as part of an IAP System 100. Other implementations include proprietary software installed from a computer readable medium, such as a CD ROM. The invention may therefore be implemented in digital electronic circuitry, computer hardware, firmware, software, or in combinations of the above. Apparatus of the invention may therefore be implemented in a computer program product tangibly embodied in a machine-readable storage device for execution by a programmable processor; and method steps of the invention may be performed by a programmable processor executing a program of instructions to perform functions of the invention by operating on input data and generating output.

In some embodiments, data contained in a database can be scrubbed or otherwise enhanced. Data scrubbing can be utilized to store information in a manner that gives efficient access to pertinent data and facilitate expedient access to data.

FIG. 5 illustrates a controller 500 that is descriptive of the access devices shown, for example, in FIG. 4 according to some embodiments of the present invention. The IAP System 100 controller 403 comprises a processor 510, such as one or more processors, coupled to a communication device 520 configured to communicate via a communication network (not shown in FIG. 5). The communication device 520 may be used to communicate, for example, with one or more network access devices 420.

The processor 510 is also in communication with a storage device 530. The storage device 530 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 530 can store a program 515 for controlling the processor 510. The processor 510 performs instructions of the program 515, and thereby operates in accordance with the present invention. For example, the processor 510 may receive data in accordance with the steps above and generate suggested steps 102 and/or artifacts 103. The processor 610 may also transmit information descriptive of suggested steps 102 and/or artifacts 103. The storage device 630 can store related data in one or more databases 700-800.

Graphical User Interface

Figure 6:
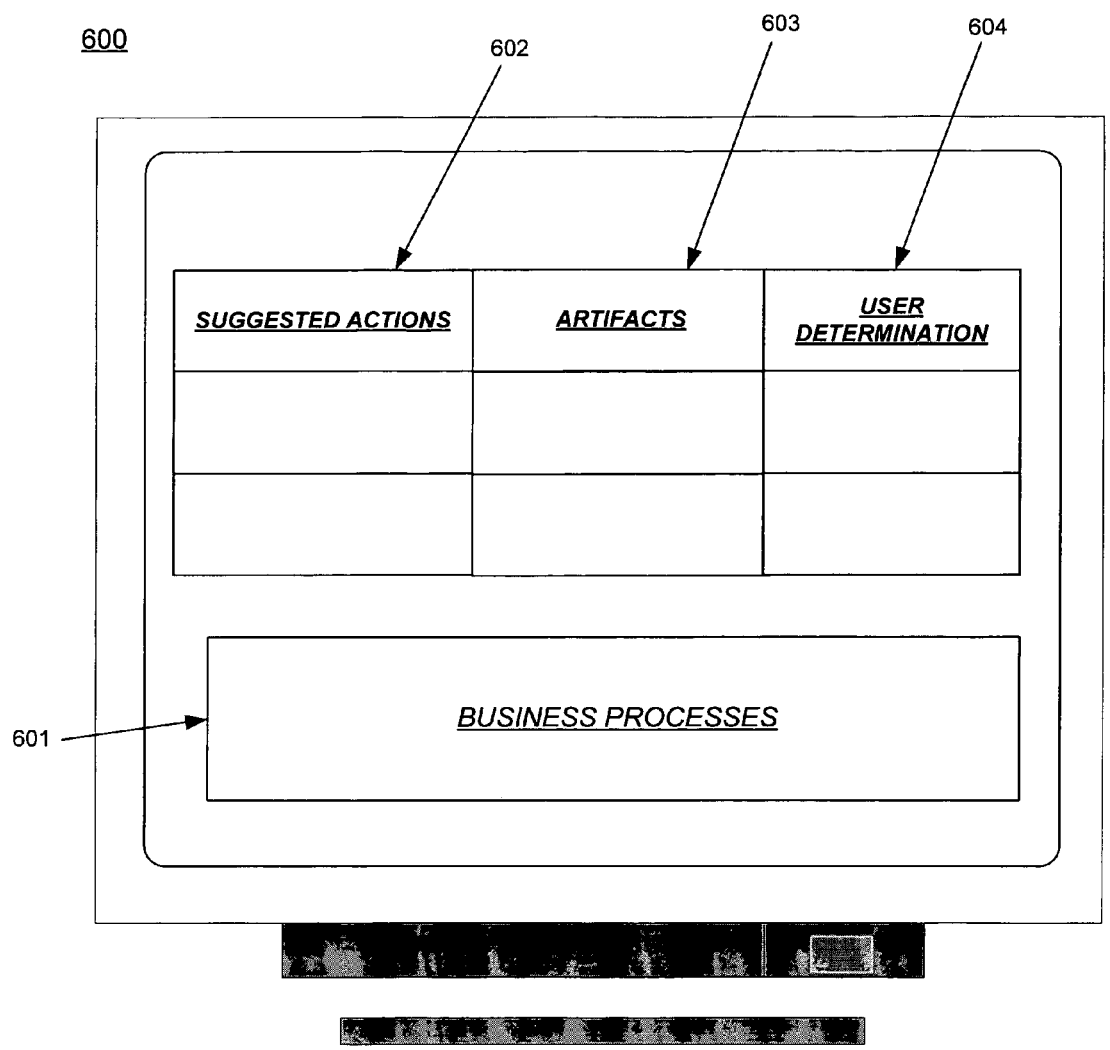
FIG. 6 illustrates a graphical user interface that can be utilized while implementing the present invention.

Referring now to FIG. 6, a GUI 600 that can be utilized while implementing the present invention can include an area 601 that is interactive for receiving input and displaying information descriptive of a business process and linking components of the business process to suggested actions 102 and artifacts 103. In addition the GUI 600 can include an interactive area 602 for receiving and displaying information descriptive of one or more suggested actions 102 and an interactive area 603 for receiving and displaying information descriptive of one or more artifacts that can facilitate identification, management or protection of proprietary data. Some embodiments can include an area 604 for receiving and displaying a determination of a user accessing the IAP system 100 and providing system access rights according to the determination.

A number of embodiments of the present invention will be described in this document. Nevertheless, it will be understood that various modifications may be made without departing from the spirit and scope of the invention. Accordingly, other embodiments are within the scope of the following claims.

What is claimed is:

1. A computer-implemented method for facilitating the identification, management or protection of confidential proprietary data, the method comprising:

receiving data descriptive of an instance of confidential proprietary information;

receiving into a database data descriptive of one or more entities involved in at least one of: creating, conveying, receiving or accessing the instance of confidential proprietary information;

automatically generating one or more suggested actions based upon the data received and relating to the protection of the instance of confidential proprietary information; and automatically generating one or more artifacts based upon the data received and in support of the one or more suggested actions related to the protection of the instance of confidential proprietary information.

2. The method of claim 1 additionally comprising the step of receiving one or more rules that are referenced by the computer implementing the method to automatically generate the one or more suggested actions and the one or more artifacts.

3. The method of claim 1 additionally comprising the step of receiving into the computer implementing the method, data descriptive of a purpose and setting under which the instance of confidential proprietary information will be created, conveyed, received or accessed, and automatically generating one or more artifacts responsive to the purpose and setting.

4. The method of claim 1 additionally comprising the step of receiving into the computer implementing the method, data descriptive of a time period during which the instance of confidential proprietary information will be created, conveyed, received or accessed, and automatically generating one or more artifacts based upon the time period.

5. The method of claim 1 wherein the one or more artifacts automatically generated comprise an agreement with language stating an intent to bind the one or more entities regarding protection of the instance of confidential proprietary information.

6. The method of claim 1 wherein the one or more suggested actions comprises automatically generating a non-disclosure agreement with language stating an intent to bind the one or more entities regarding protection of the instance of confidential proprietary information.

7. The method of claim 1 wherein the one or more suggested actions additionally comprises at least one of: preparing an invention disclosure form; conducting a patentability search; and filing a patent application.

8. The method of claim 1 wherein the one or more suggested actions comprises the steps of: determining a time period during which a classification will be associated with the instance of confidential proprietary information; and associating an indicator of an automatically generated classification with the instance of confidential proprietary information during the time period.

9. The method of claim 1 wherein the one or more suggested actions additionally comprises automatically restricting access to the instance of confidential proprietary information.

10. The method of claim 1 wherein the one or more suggested actions comprises determining which users access the instance of confidential proprietary information and automatically storing an indication of those users' accesses.

11. The method of claim 1 wherein the one or more suggested actions comprises conveying the instance of confidential proprietary information subject to an existing non-disclosure agreement with language stating an intent to bind the one or more entities regarding the disclosure of the instance of confidential proprietary information.

12. The method of claim 1 wherein the one or more suggested actions additionally comprises automatically tracking one or more entities to whom the instance of confidential proprietary information is revealed or from whom it is received.

13. The method of claim 1 wherein the one or more suggested actions comprises the automatic development of an inventory of data descriptive of the instance of confidential proprietary information.

14. A computer-implemented method for facilitating protection of an instance of confidential proprietary information, the method comprising:
receiving data descriptive of an instance of confidential proprietary information;
based upon the data descriptive of the instance of confidential proprietary information, automatically generating examples of confidential proprietary information associated with one or more classifications; and
automatically generating one or more suggested actions related to the instance of confidential proprietary information based upon the data descriptive of the instance of confidential proprietary information and the one or more classifications to be associated with the instance of confidential proprietary information.

15. The method of claim 14 additionally comprising the steps of:
receiving data defining a set of entities authorized to access the instance of confidential proprietary information; and
automatically implementing one or more suggested actions facilitating protection of the instance of confidential proprietary information based upon the indication of the classification to be associated with the instance of confidential proprietary information.

16. A computer-implemented method for facilitating identification, management or protection of an instance of confidential proprietary information, the method comprising:
receiving data descriptive of a business process;
based upon the data descriptive of a business process, automatically presenting one or more suggested action items associated with protecting an instance of confidential proprietary information created, revealed, received or accessed in connection with the business process; and
automatically generating one or more artifacts related to the protection of the instance of confidential proprietary information based upon the data descriptive of the process and a potential for creating, revealing or accessing the instance of confidential proprietary information as a result of the process.

17. A computerized system for facilitating identification, management or protection of an instance of confidential proprietary information, the system comprising: a computer server accessible with a network access device via a communications network; and executable software stored on the server and executable on demand, the software operative with the server to cause the system to:
receive data descriptive of an instance of confidential proprietary information;
receive data descriptive of one or more entities involved in at least one of:
creating, conveying, receiving or accessing the instance of confidential proprietary information;
automatically generate one or more suggested actions based upon the data received and relating to the protection of the instance of confidential proprietary information; and
automatically generate one or more artifacts based upon the data received, wherein the artifact facilitates protection of the instance of confidential proprietary information.

18. Computer executable program code residing on a computer-readable medium, the program code comprising instructions for causing the computer to:
receive data descriptive of an instance of confidential proprietary information;
receive data descriptive of one or more entities involved in conveying the instance of confidential proprietary information;
automatically generating one or more suggested actions based upon the data received and relating to the protection of the instance of confidential proprietary information; and
automatically generating one or more artifacts based upon the data received, wherein the artifact facilitates protection of the instance of confidential proprietary information.

19. A method of interacting with a network access so as to facilitate identification, management or protection of an instance of confidential proprietary information, the method comprising the steps of:
initiating communication with a server via a network;
inputting data descriptive of an instance of confidential proprietary information into a database on the server;
inputting data descriptive of one or more entities involved in creating, conveying, receiving or accessing the instance of confidential proprietary information into the database on the server;
inputting data descriptive of a time period during which the instance of confidential proprietary information will be created, conveyed, received or accessed into the database on the server;
receiving data descriptive of one or more suggested actions wherein the data descriptive of the one or more actions is automatically generated based upon the data input into the database on the server and wherein the suggested action relates to the protection of the instance of confidential proprietary information; and
receiving one or more artifacts with content based upon the data input into the database on the server.

20. A computer-implemented method for facilitating management of an instance of confidential proprietary information, the method comprising:
receiving data descriptive of an instance of confidential proprietary information to be protected;
receiving data descriptive of one or more entities involved in at least one of: creating, conveying, administering, securing, receiving and accessing the instance of confidential proprietary information;
providing a computer interface comprising one or more options relating to protection of the instance of confidential proprietary information, wherein the one or more options comprise automatically creating a record in a database of recipients of the instance of confidential proprietary information;

automatically generating one or more suggested actions based upon the data descriptive of the instance of confidential proprietary information to be protected and the data descriptive of the one or more entities; and automatically generating one or more artifacts based upon the data descriptive of the instance of confidential proprietary information to be protected and the data descriptive of the one or more entities wherein the one or more artifacts comprise at least one of: a list of entities to whom the instance of confidential proprietary information has been disclosed and a list of instances of confidential proprietary information that has been disclosed.

21. The method of claim 20 wherein the one or more artifacts additionally comprise a report indicating the status of one or more of: creation of an instance of confidential proprietary information and conveyance of an instance of confidential proprietary information.

22. A computer-implemented method for automatically creating and maintaining a database inventory of confidential proprietary information by category classification, the method comprising:

receiving data descriptive of an instance of confidential proprietary information;

automatically indicating a category associated with the instance of confidential proprietary information based upon the data descriptive of the instance of confidential proprietary information, wherein the category is automatically retrieved from a database;

providing a user interface comprising one or more user selectable options, wherein the options comprise at least one of: adding a new category of confidential proprietary information to the database and adding a new instance of confidential proprietary information to the database;

automatically generating one or more suggested actions based upon the data descriptive of the instance of confidential proprietary information and the category indicated; and automatically generating one or more artifacts based upon the data descriptive of the instance of confidential proprietary information and the category indicated, wherein the artifact comprises one or more of: a list of instances of confidential proprietary information and a list of instances of confidential proprietary information categorized according to specific confidentiality classifications.

23. A method of interacting with a network device to facilitate identification, management or protection of confidential proprietary information, the method comprising the steps of:

initiating communication with a server via a communications network;

inputting data descriptive of an instance of confidential proprietary information via a user interface or other application server;

inputting data descriptive of one or more entities involved in creating, conveying, receiving or accessing the instance of confidential proprietary information;

receiving automatically generated one or more suggested actions based upon the data descriptive of the instance of confidential proprietary information and the data descriptive of one or more entities; and receiving an automatically generated agreement specifying rights and obligations relating to the instance of confidential proprietary information based upon the data descriptive of an instance of confidential proprietary information and the data descriptive of one or more entities.

* * * * *